(12) United States Patent
Sell (10) Patent No.: US 8,429,233 B2
(45) Date of Patent: Apr. 23, 2013

(54) METHOD AND SYSTEM FOR JOURNALING ELECTRONIC MESSAGES

(75) Inventor: Jörg-Stefan Sell, Eching (DE)

(73) Assignee: Open Text Software GmbH, Grasbrunn (DE)

( * ) Notice: Subject to any disclaimer, the term of this patent is extended or adjusted under 35 U.S.C. 154(b) by 1282 days.

(21) Appl. No.: 11/305,543

(22) Filed: Dec. 15, 2005

(65) Prior Publication Data
US 2007/0038714 A1      Feb. 15, 2007

(30) Foreign Application Priority Data
Jun. 30, 2005  (EP) .................................... 05105987

(51) Int. Cl.
*G06F 15/16*   (2006.01)

(52) U.S. Cl.
USPC ........... 709/206; 709/201; 709/238; 709/202; 709/203

(58) Field of Classification Search .................. 709/206, 709/201, 238
See application file for complete search history.

(56) References Cited

U.S. PATENT DOCUMENTS

| | | | | |
|---|---|---|---|---|
| 5,898,836 | A * | 4/1999 | Freivald et al. ............... | 709/218 |
| 6,907,112 | B1 * | 6/2005 | Guedalia et al. ........... | 379/88.17 |
| 7,249,175 | B1 * | 7/2007 | Donaldson ................... | 709/225 |
| 2001/0032245 | A1 * | 10/2001 | Fodor ............................ | 709/206 |
| 2002/0038312 | A1 * | 3/2002 | Donner et al. ................ | 707/200 |
| 2002/0065892 | A1 | 5/2002 | Malik ............................ | 709/206 |
| 2003/0050984 | A1 * | 3/2003 | Pickup et al. ................. | 709/206 |
| 2003/0110227 | A1 * | 6/2003 | O'Hagan ...................... | 709/206 |
| 2003/0191969 | A1 * | 10/2003 | Katsikas ....................... | 713/201 |
| 2005/0055359 | A1 | 3/2005 | Kawai et al. | |
| 2005/0234851 | A1 * | 10/2005 | King et al. ........................ | 707/1 |

FOREIGN PATENT DOCUMENTS

| | | |
|---|---|---|
| EP | 0497578 A2 * | 8/1992 |
| EP | 1 035 690 | 9/2000 |
| EP | 0497578 A2 * | 7/2001 |
| WO | WO 02/065316 | 8/2002 |

OTHER PUBLICATIONS

P. Resnick, Internet Message Format, Network Working Group, The IETF Trust, Oct. 2008, 58 pgs., Qualcomm Incorporated, San Diego, CA at http://tools.ieft.org/html/rfc5322 . . . , printed Dec. 14, 2010.
P. Resnick, Internet Message Format, Network Working Group, Apr. 2001, The Internet Society, 40 pgs., Qualcomm Incorporated, San Diego, CA at http://faqs.org/rfc2822.html, printed Dec. 14, 2010.

* cited by examiner

*Primary Examiner* — Lan-Dai T Truong
(74) *Attorney, Agent, or Firm* — Sprinkle IP Law Group (57) ABSTRACT

A method and system is provided for efficient journaling and management of electronic messages, wherein a copy of a first message sent from or received on a mail server is received, the copy of the first message is then recorded by a journal service, wherein the journal service comprises determining whether the first message contains an identification for which a second message has already been recorded and adding only metadata of the first message to the metadata of the second message when for the identical identification the second message has already been recorded.

38 Claims, 7 Drawing Sheets table of Attribute-Service – email is recognized as a dublicate and only new recipients are added to the Recipient-Table – 2<sup>nd</sup> recipient: 'gondrom@opentext.com' is added ↘ 460

Table of journaled emails

| Internal ID | Message-ID | Further Metadata (e.g. Date, size, ...) | Recipient list-ID | Link to email in archive |
|---|---|---|---|---|
| 1 | 36874 | 10.06.2005 | List-01 | docid123 |
| 2 | 36875 | 13.06.2005 | List-23 | docid456 |
| ... | ... | ... | ... | ... |
| ... | ... | ... | ... | ... |

Recipient-Table

| list-id | recipient |
|---|---|
| List-01 | sieckmann@bettenpat.com |
| List-01 | gondrom@opentext.com |

Table of Attribute-Service – email entered the first time – 1st recipient 'sieckmann@bettenpat.com' is entered in Recipient-Table Table of journaled emails — 465

| Internal ID | Message-ID | Further Metadata (e.g. Date, size, …) | Recipient list-ID | Link to email in archive |
|---|---|---|---|---|
| 1 | 36874 | 10.06.2005 | List-01 | docid123 |
| 2 | 36875 | 13.06.2005 | List-23 | docid456 |
| … | … | … | … | … |

Recipient-Table — 470

| list-id | recipient |
|---|---|
| List-01 | sieckmann@bettenpat.com |

--- table of Attribute-Service – email is recognized as a dublicate and only new recipients are added to the Recipient-Table – 2nd recipient: 'gondrom@opentext.com' is added Table of journaled emails — 465

| Internal ID | Message-ID | Further Metadata (e.g. Date, size, …) | Recipient list-ID | Link to email in archive |
|---|---|---|---|---|
| 1 | 36874 | 10.06.2005 | List-01 | docid123 |
| 2 | 36875 | 13.06.2005 | List-23 | docid456 |
| … | … | … | … | … |

Recipient-Table — 470

| list-id | recipient |
|---|---|
| List-01 | sieckmann@bettenpat.com |
| List-01 | gondrom@opentext.com |

METHOD AND SYSTEM FOR JOURNALING ELECTRONIC MESSAGES

CROSS-REFERENCE TO RELATED APPLICATION

This application claims priority under 35 U.S.C. §119 to European patent application 05105987.1, filed Jun. 30, 2005.

FIELD OF THE INVENTION

The present invention relates to journaling of electronic messages, and particularly, to the determination of identical messages during journaling of the messages, and more particularly, to a method and system for efficient journaling, management and/or archiving of electronic messages sent from or received on a mail server.

DESCRIPTION OF THE RELATED ART

Program systems for processing electronic messages such as, e.g., electronic mail ("e-mail" or "email") or other message formats for sending text, image, sound or other data are known in the art. An electronic mail has become an indispensable tool for facilitating business and personal communications. Through computer networking systems such as local area networks ("LAN"), wide are networks ("WAN"), and the intranet or the world-wide web ("WWW"), users can send and receive e-mails, notes, messages, letters, etc., to communicate with others who are in the same office or in any remote location across the world.

Program systems for processing electronic messages like e-mail application programs are typically configured for generating messages in the form of e-mails. An e-mail application user interface of an e-mail-client guides a user to compose an e-mail message by providing a platform for entering at least one outgoing e-mail address, a "subject" heading, and a "body" for the actual message. Furthermore, the user may also designate a document, file or even an executable program to be attached to the e-mail message. When the user completes typing the message and presses the "send" key, the message is transmitted over the network and is routed for delivery from an e-mail server corresponding to the sending address to an e-mail server corresponding to the provided destination address.

It is of course desirable not only for companies to establish message archiving and journaling in order to be able to easily access and read messages received and sent by a user. Nowadays it even becomes an obligation by law that companies, and in particular e.g. banks and insurance companies, save a copy of every e-mail message that is sent from or received on an e-mail server of the company and contains business related content.

It is common for users to send a single e-mail message to multiple recipients. This typically occurs when the e-mail message pertains to a subject-matter that is of common interest. Some of the recipients may in turn forward this e-mail message to other groups of recipients. For such purpose, e-mail application programs provide the feature of generating a common generic e-mail address for a group of recipients which is also known as "alias". An e-mail address of a user may of course belong to different aliases. For example, the e-mail address of an employee of a company belongs to the alias e-mail addresses europe@company.com, design_department@company.com and project123@company.com. Thus, if an e-mail message is sent to all these three aliases as recipients, the e-mail message is handed over to up to three mail servers to resolve the aliases and then to journal it.

A known system for processing electronic messages comprises a gateway mail server of, e.g., an international company. An e-mail message to alias recipient europe@company.com is received by the gateway mail server and transmitted to a mail server for further processing. This mail server is able to resolve the alias "Europe" in national sub-aliases, e.g., "France" and "Germany" and e-mail addresses administered by this mail server. For journaling purpose, a copy of the e-mail with resolved recipient information ("France", "Germany" and local user names administered by this mail server) is sent to a journal server. The e-mail server then also delivers the e-mail to other mail servers for further resolving and processing the national aliases (e.g. "France" and "Germany"), respectively. These e-mail servers also send copies of the e-mail to the journal server with resolved address information. For example, another mail server resolves the alias "Germany" in local aliases "Munich" and "Hamburg" and e-mail addresses of employees administered by this mail server and belonging to one of the respective aliases. The e-mail is then routed to further mail servers to be delivered and again copies of e-mails with resolved address information are sent to the journal server and so on. Thus, multiple copies of the same e-mail received by the gateway mail server are received and stored by the journal server. According to the obligation by law to save a copy of every e-mail message sent from or received on a mail server of a company together with sender and recipient information it is necessary to resolve all aliases by the respective mail servers and then to send a copy of the e-mail to the journal server.

The need to store multiple copies of the same electronic message(s) in the journal server or an external file server lead to a considerable memory consumption so that a storage problem could be rendered and also result in a reduced readability of the journal itself. In large enterprise computer networks of, e.g., international companies with multiple e-mail servers the storage problem can be rendered even more acute since possible all e-mail server are involved in the resolution of an incoming e-mail since every single e-mail server is able to only resolve those aliases of which the e-mail addresses of the users are administered by that e-mail server. This means that the journal server receives multiple copies of an electronic message at different times depending on when each of the respective e-mail servers received, processed, including resolving of e-mail addresses, and then sent a copy of the e-mail to the journal server. This also means that the multiple copies of the e-mails in the journal server are recorded in an uncertain order in the journal comprising a list of all recorded electronic messages. This further means that readability and further processing of the journal is difficult. This is in particular the case since every copy of the journaled electronic message comprises different recipient information of resolved e-mail addresses and unresolved alias e-mail addresses which makes readability even worse.

There has been proposed so-called envelope journaling which became available with Exchange 2000 Service Pack 3 RollUp and Exchange Server 2003 Service Pack 1 by Microsoft Corporation. Envelope journaling embeds the original message in another message (the "envelope") with the list of all those final recipients that received the message. However, also with envelope journaling it can not be avoided that duplicate recipients are listed in the journal. This is by design of the envelope journaling since envelope journaling is not able to remove duplicates. Furthermore, since the original message is embedded in the journaled message the problem of storage consumption is being rendered yet more acute.

A further difficulty may arise if a user wants to determine who all the recipients of an electronic message in the organization are. In presently available e-mail communications and journaling systems, the only way to discover all internal recipients of a message that is received from an external sender is through an exhaustive search in the journal. The need for such an exhaustive search and the duplication of recipients and journaled messages in the journal reduces efficiency of the journal server and readability of the journal report.

SUMMARY OF THE INVENTION

In view of the difficulties described above regarding the duplication of messages or recipients in the journal report or a journal server, there is a need for a method and system for automatically detecting and consolidating storage of duplications electronic messages and/or recipients of an electronic message received in a journal server.

Methods and systems consistent with the present invention provide an automated and efficient journaling, management and/or archiving of electronic messages.

According to a first aspect, an object of the present invention is to provide a method for journaling of electronic messages containing metadata like a recipient e-mail addresses. A copy of an electronic message sent from or received by a message store like a mail server is received on a journal server. A relocation service then reads, processes and records the copy of the received message by first determining whether the message contains an identification for which another message has already been recorded. If for the determined identification of the newly received message another message has already been recorded, the newly received message is not recorded again but only the metadata of the newly received message is added to the metadata of the already recorded message having identical identification.

According to another aspect of the present invention, a system for journaling of electronic messages is provided. The system comprises a relocation service which receives copies of messages sent from or received on a mail store like a mail server or a standard journal server. The relocation service reads and determines whether the received message contains an identification for which a message has already been recorded on a memory or mail store. If for this identification a message has already been recorded only metadata of the received message is added with the metadata of the previously recorded message having identical identification.

In accordance of further aspects of the present invention, methods and systems, as embodied and broadly described herein, comprise and are configured to provide a relocation service or an archive server carrying out the steps of reading a copy of every electronic message that is sent from or received on one or more e-mail servers or a standard journal server. The e-mail is then processed by determining an identification like a message-ID of the e-mail and it is checked whether an e-mail with identical identification has already been recorded. If an e-mail with identical identification has already been processed which means that there is an entry in the message-ID table for this identification, a verification value like for example a checksum over the content of the e-mail is generated and compared with the verification value of the already recorded message with identical identification. If according to the comparison also the verification values are consistent the metadata of the already recorded e-mail are supplemented by additional attributes like. e.g. new recipient address information of the newly received e-mail to the already existing entry of the recorded message. If according to the comparison the verification values are different, the method or system recognizes a possible falsification despite identical identification and the newly received e-mail is completely recorded as an independent e-mail and a warning of a falsification attempt may be send to the administrator.

According to yet another aspect of the present invention, the relocation service or archive server are configured to record the processed message by an archive service and an attribute service. The message itself is independently stored by the archive service itself if a message with such an identification and verification value has not yet processed before and then in the attribute service a new entry for this new message is generated. The entry contains metadata of and a link to the new e-mail stored by the archive service. If according to the comparison of identification and verification values it is determined that the e-mail has already been recorded before, e.g. for another recipient, then the e-mail is not again recorded by the archive service and only the new recipient information as a further attribute is added to the metadata in the attribute service for the respective e-mail.

In accordance with the principles of the present invention, method and systems, as embodied and broadly described herein, support a user to implement e-mail journaling with one or more of the following features. According to the determination of already recorded identical messages the separate storage of duplications of complete e-mails can be avoided. Thus, the readability of the journal report can be arranged more clear and the common recipients of an e-mail can be easily recognized without the need for an exhaustive search of the whole report or even of different journal mailboxes so that readability of the journal report can be increased significantly. With respect to the verification value which is also checked according to an aspect of the present invention, a possible falsification of the message-ID of an e-mail can be detected. This is in particular important since in e-mail communications systems it can not be guaranteed that during transmission of the e-mail between e.g. different e-mail servers and the journal server the message-ID has not been modified. If then the determination whether the e-mail has already been recorded by the relocation service is only based on the message-id it would be possible to pretend to the message or system that a certain recipient has received a certain e-mail although only an e-mail with identical identification has been sent to this recipient. The verification value should therefore be chosen carefully. As it will be described further below, according to an embodiment of the present invention the identification value is based on content information and technical attributes of the e-mail which are appropriate to uniquely identify each e-mail.

A further aspect of the present invention relates to the reconstruction and retrieval of electronic messages which have been previously journaled according to methods and systems described herein.

According to further aspects of the present invention, a computer program, a computer program product and articles of manufacture, e.g., an electronic storage medium for storing computer executable code for the journaling of electronic messages according to methods and systems described herein are provided.

BRIEF DESCRIPTION OF THE DRAWINGS

Further advantageous embodiments and aspects of the present invention are disclosed and will become more apparent by the accompanying drawings described in the following and illustrating an implementation and exemplary embodiments of the present invention and, together with the description and the appended claims, serve to explain the advantages and principles of the invention. In the drawings.

DETAILED DESCRIPTION

Reference will now be made in detail to implementations consistent with the present invention as illustrated in the accompanying drawings. Whenever possible, the same reference number will be used throughout the drawings and the following description to refer to the same or like parts.

The present invention provides methods and systems for journaling of electronic messages, e.g. e-mails sent from or received on mail servers in an e-mail communications system. The described methods and systems for efficient journaling and management of e-mails have obvious advantages. Journals, also referred to as journal reports, previously contained multiple copies of the same e-mail with different and even duplicate recipient information and now are recorded in a manner that of each journaled e-mail only one copy is recorded. For this one copy of the journaled e-mail complete recipient information are provided by the methods and systems according to the present invention as part of so-called metadata of the e-mail. The metadata comprises recipient information like resolved e-mail addresses as well as sender information, the so-called message-ID, sending time and further technical attributes of the e-mail, e.g. size of the e-mail, whether or not it contains and which attachments etc.

Figure 1:
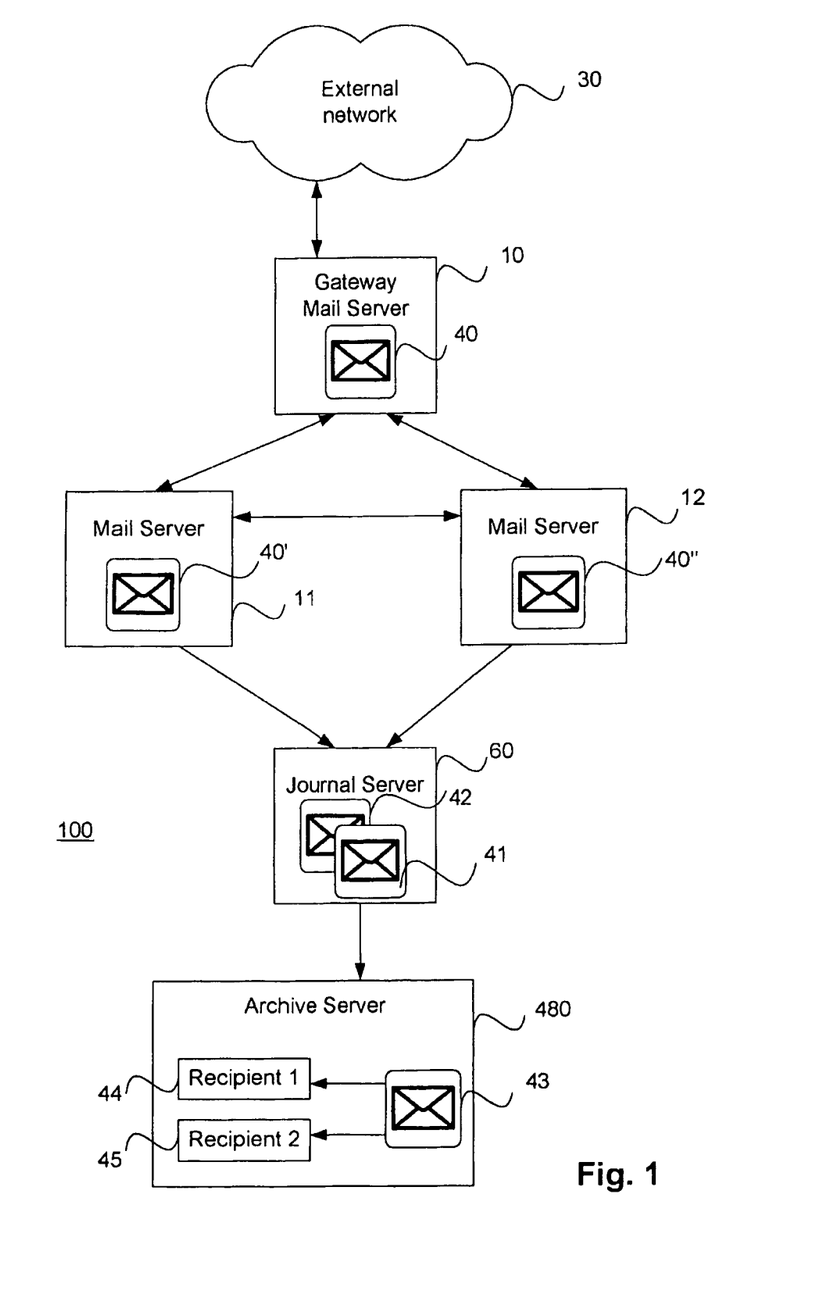
FIG. 1 illustrates an exemplary distributed e-mail communications system in which systems consistent with the present invention may be implemented.

The present invention will now be described in more detail with reference to FIG. 1. FIG. 1 is a schematic diagram of an exemplary distributed e-mail communications system in which methods and systems consistent with the present invention may be implemented. Distributed e-mail communications system 100 is composed of various components, including both hardware and software. The e-mail communications system 100 includes a gateway server 10 for transmitting and receiving e-mails over an external network 30, e.g. the internet, mail servers 11 and 12 for resolving of alias e-mail addresses and storing e-mails of local recipients, a journal server 60 receiving and recording a copy of e-mails that are sent from mail servers 11 and 12, and an archive server 480 according to an embodiment of the present invention. The e-mail 40 is transmitted from gateway mail server 10 to either one of or both mail servers 11 and 12 for resolving alias e-mail addresses. Once e-mail aliases have been resolved by mail servers 11, 12 the e-mail is locally stored for the recipient and further distributed to possible other mail servers for further resolving of unresolved alias addresses. Copies of locally stored e-mails 40', 40" are transmitted to and received by journal server 60 as e-mails to be journaled 41, 42. Archive server 480 then reads and further processes the copies of e-mails 41, 42 to be journaled using a relocation service (not shown in FIG. 1). The relocation service determines whether both e-mails 41, 42 are identical with an already stored e-mail. For example, if there is no already stored e-mail that is identical to e-mail 41, this e-mail this stored as e-mail 43 with a link to extracted metadata comprising recipient information "Recipient 1" 44. Then, it is determined whether there is an already stored e-mail identical to e-mail 42. If stored e-mail 43 is identical to e-mail 42, this e-mail is not stored again but only the metadata of this e-mail are recorded together with the already stored metadata as updated metadata containing now also the recipient information "Recipient 2" 45 of e-mail 42. Thus, for identical e-mails 41, 42 there is only stored one copy 43 with a link to its metadata 44, 45 comprising recipient information of both e-mails 41 and 42.

Figure 2:
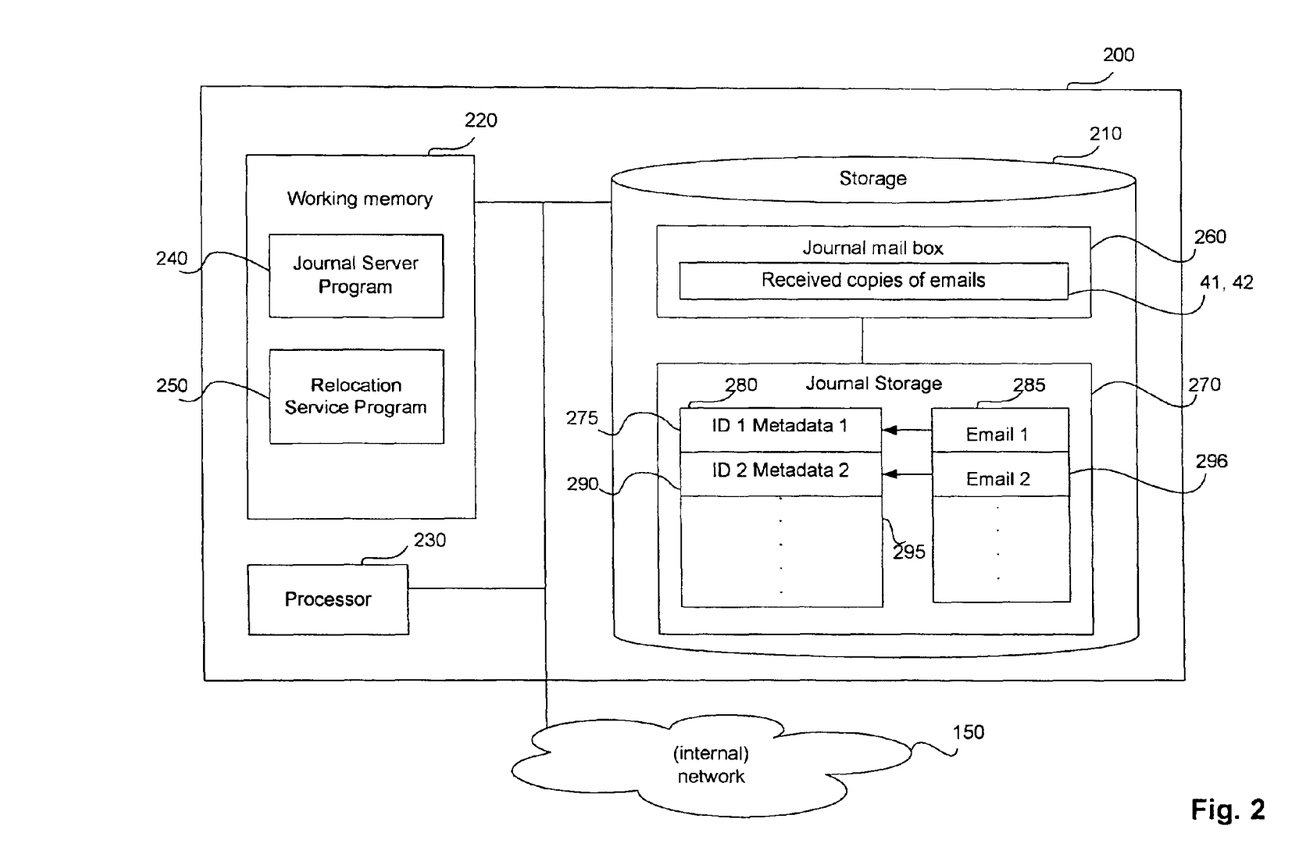
FIG. 2 is as schematic block diagram of a server structure according to the present invention.
Figure 3:
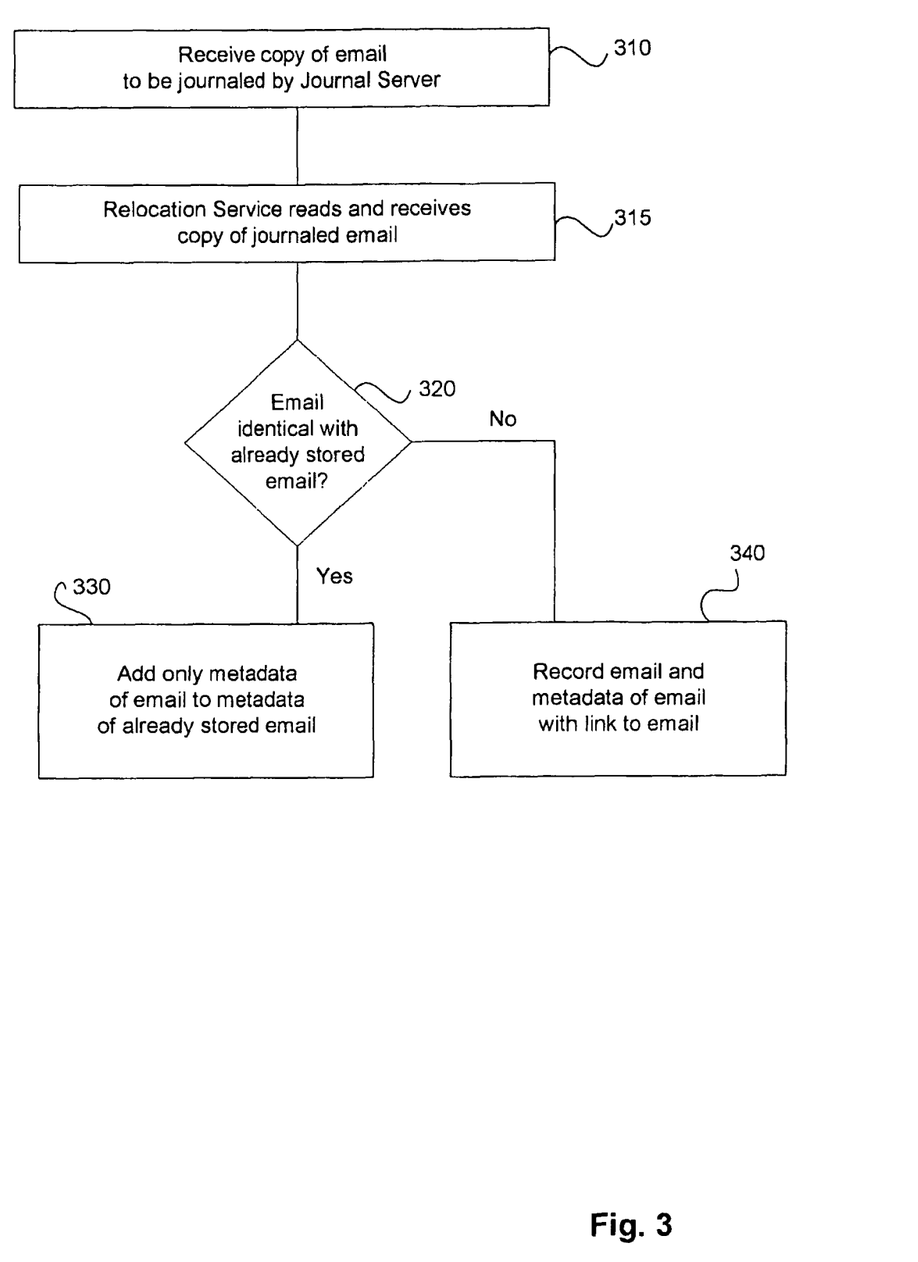
FIG. 3 is a flow chart of a method according to an embodiment of the present invention.

The relocation service will now be described in more detail according an embodiment of the present invention with reference to FIG. 2 showing a schematic diagram of a server 200 and with reference to FIG. 3 showing a flow diagram of a method for efficiently journaling of e-mails. Server 200 constitutes a system according to an embodiment of the present invention and comprises the functionality of journal server 60 and archive server 480. Server 200 includes a storage 210 containing a journal mailbox 260 and a journal store 270, working memory 220, storing journal server program 240 and relocation service program 250, processor 230 processing the e-mails according to said programs, and is connected over a network 150 to one or more mail servers of the e-mail communications system 100. The storage or mail memory ("memory") 210 comprises a journal mailbox 260 to store received copies of e-mails 41, 42 that are sent from or received on one of the mail servers.

FIG. 3 is a flow chart of the operations that the server 200 carries out to efficiently journal a copy of an e-mail received in the journal mailbox according to the instructions of journal server program 240 (operation 310). According to instructions of relocation service program 250, the copy of the e-mail is read from the journal mailbox and received by the server in operation 315, the received copy 41, 42 is then further processed by determining whether the identification, for example a message-ID, is identical to an identification "ID1", "ID2" 275, 290 for which another e-mail has already been recorded in memory identified as journal storage 270 (operation 320). According to other embodiments, the server 200 or archive server 480 comprise several different servers with different memories for storing the e-mails to be recorded, which will be described below. In journal storage 270, the actual message or content of the e-mail ("e-mail1"), ("e-mail2") 285, 296 is stored separately from the associated metadata and identification ("ID1, metadata1", ID2, metadata2"), 275, 280, 290, 295, wherein the identification and metadata and possible further technical attributes form a so-called entry for the e-mail to which the associated e-mail is linked using, e.g., another internal ID. If the determination of the identification yields an identical identification in journal storage 270 the method branches to operation 330 and adds only the metadata of the e-mail to be recorded to the metadata of an e-mail that has already been recorded and contains identical identification. If there is no e-mail with identical identification in journal storage 270 the method branches to operation 340 and the complete e-mail is processed and recorded in the journal storage by recording the e-mail and generating a new entry containing identification and metadata to which the newly recorded e-mail is linked. As a result, every e-mail is only recorded once in the journal storage even if multiple copies of this e-mail are received in journal mailbox 260. Each e-mail 285, 296 in journal storage 270 is linked to an entry containing the associated metadata for this e-mail so that, e.g., the complete recipient information are always obtainable over the relocation service program 250.

According to other embodiments of the present invention, the journal server program 240, the relocation service program 260, and archive and attribute services (which will be described in detail below) run in working memories of different physical servers. Additionally the parts of the storage 210 may be distributed among several separate storages of different servers.

According to an embodiment of the present invention, copies 41, 42 in the journal mailbox 260 are removed after they have been processed and recorded by a method according to the present invention.

Figure 4:
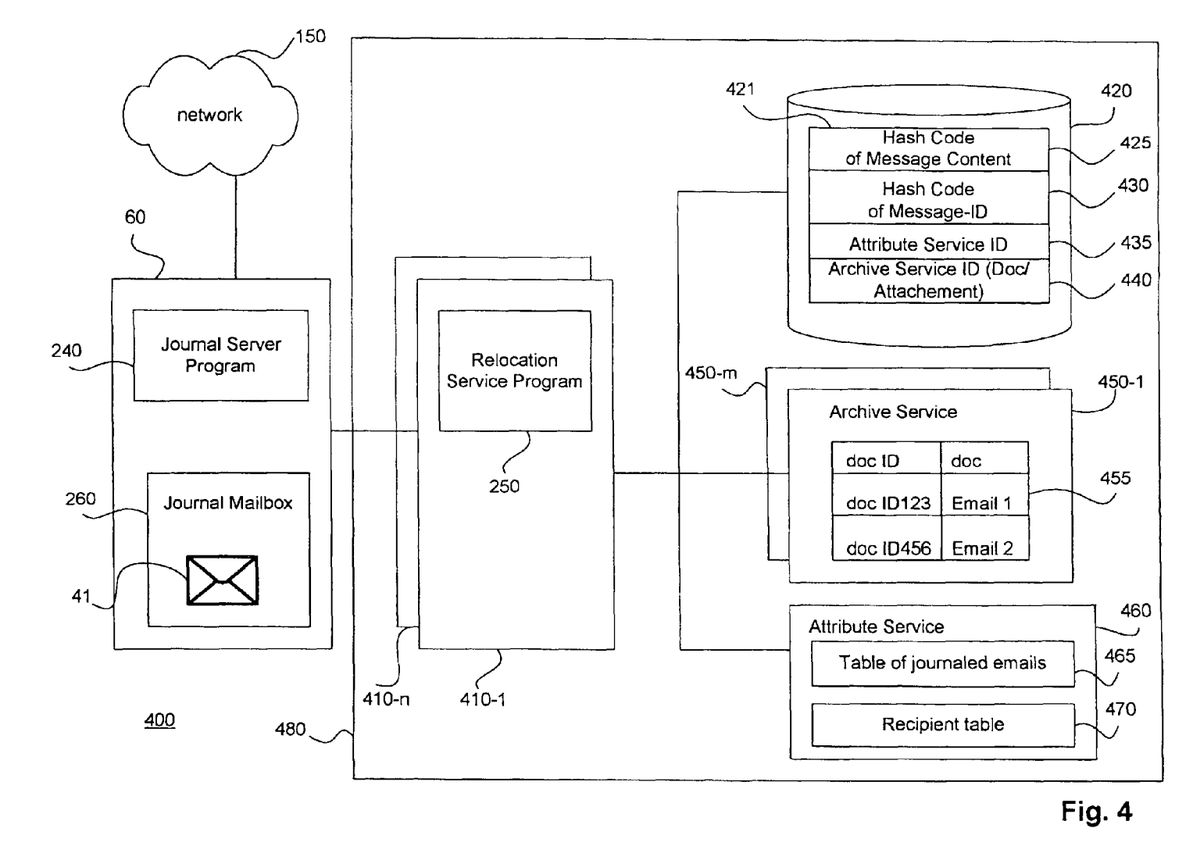
FIG. 4 is a block diagram of a system according to an embodiment of the present invention.

Further embodiments of the present invention will now be described with reference to FIGS. 4, 5a, 5b and 6. FIG. 4 shows a schematic block diagram of a system for journaling e-mails. Journaling system 400 comprises the archive server 480 which includes at least one relocation service 410, a database structure 420, at least one archive service 450, and attribute service 460. The archive server 480 is connected to a known journal server 60 which is not necessarily part of the system. According to an embodiment, functionality of journal server 60, namely journal server program 240 and journal mailbox 260, could however be integrated into archive server 480, e.g., as described above with reference to FIG. 2. The journal server 60 is again connected to network 150 over which copies of e-mails to be journaled ("e-mail") 41 are received in journal mailbox 260.

A relocation service 410 includes relocation service program 250 processing e-mail 41 read from journal mailbox 260 according to methods described herein. According to an embodiment, there is not only one relocation service 410 but multiple relocation services 410-1, 410-2, . . . , 410-n in the system. The provision of multiple relocation service, on one or more different servers, has in particular in large distributed e-mail communications systems, e.g. of international companies, scaling and performance advantages.

The database structure 420 is provided to store a data record 421 described in more detail below and is connected to the relocation service 410. According to embodiments, the database structure 420 can be implemented in a separate server or stored in the storage (not shown) of archive server 480.

Archive server 450 is also connected to relocation service 410 and stores the e-mail with possibly attached file attachments. According to embodiments, the system includes either a single archive service or a plurality of archive services 450-1, 450-2, . . . , 450-m depending on performance, security and scalability requirements. The Attribute service 460 is also connected to relocation service 410 and stores the metadata of journaled e-mails in its memory.

Figure 6:
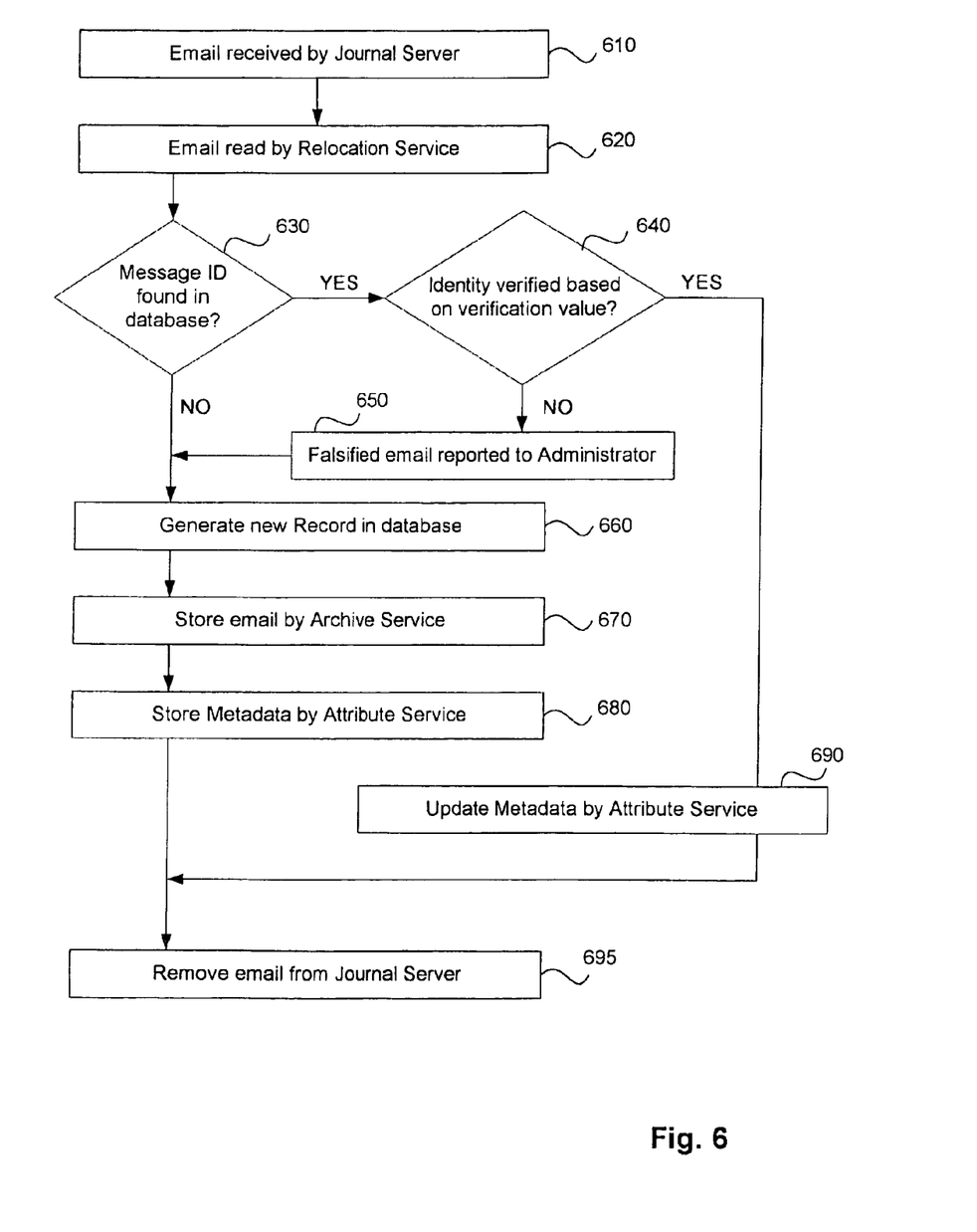
FIG. 6 is a flow chart of a method according to an embodiment of the present invention.

The process of journaling an e-mail 41 by journaling system 400 will now be described in more detail. An e-mail 41 to be journaled is sent through network 150 to journal server 60 and received in its journal mailbox 260 (operation 610 in the flowchart as illustrated in FIG. 6). The relocation service by relocation service program 250 regularly checks whether there is a new e-mail in the journal mailbox to be journaled or the journal server program informs by e.g. sending a message or setting a flag or other, the relocation service 410 that a new e-mail to be journaled has been received. In operation 620, relocation service program 250 reads e-mail 41 from journal mailbox 260 for further processing. Relocation service program 250 then checks database 420 whether there is stored a record having the identical message-ID ("identification") as the extracted identification of the processed e-mail (operation 630). According to an embodiment, the identification is the normal message-ID (also known as message submission ID) of the e-mail which is compared with message-IDs in the stored records 421. According to another embodiment, a hash code is calculated from the message-ID and compared to hash codes of message-IDs stored in the records. If relocation service program 250 has identified a record 421 with identical hash code of message ID 430 the further processing branches to operation 640 to further verify the identity the processed e-mail with an already recorded e-mail.

This further verification is an advantageous feature of a particular embodiment of the present invention since the mere identification based on the message-ID of the e-mail may not be sufficient to prove identity of two e-mail since a message-ID could become subject of amendment or even falsification to bring its transmission and processing through the e-mail communications system so that it can not always be guaranteed that an identical identification means that also the e-mails are identical. Since journal reports might become subject of investigation whether a certain user has received or sent a certain e-mail in the past, the determination of whether two e-mails are identical is most critical. Otherwise, if further verification is not implemented and the message-ID of a received e-mail has been falsified and is identical to a not falsified message-ID of an already recorded e-mail, the journal report would state that a certain user has received the e-mail with an identical not falsified message-ID but not the actual received e-mail with the falsified message-ID. According to an embodiment of the present invention, verification is carried out by calculating a verification value of the received e-mail and compare this value with the verification values of already recorded e-mails. The calculation of the verification value can be performed by any of several methods, such as checksum determination, or extraction of certain technical attribute information. According to an embodiment the verification value is calculated as a check sum of the content of the e-mail and stored as message verification value. According to a particular embodiment, the (message) verification value is calculated from one or more hash codes, applying, e.g., a secure hash algorithm (SHA) to the content of the e-mail including subject, body, attachment and further certain technical attribute information. Subject, body and attachment information means the content of the subject, the actual message ("body" or "doc"), and of possible attachment files ("attachment"). These information may however not be sufficient since a certain e-mail may be sent twice to a user which then also needs to be twice recorded in the journal report. Both e-mails have identical subject, body and attachment information but with both having different time sending information which are used as the further technical attribute information.

However, since most of the information contained in the e-mail header and which could be used as further technical attribute information are generated when sending the e-mail this information may not be trustful since they could come from and may be falsified by an untrustworthy client so that the information might not be sufficient for verification. According to an embodiment, the information in the e-mail header are used as further technical attribute information which have been added by the e-mail communications system of the user namely the gateway mail server or any other local mail server of the system. For example, the e-mail contains "Received:" information of both external untrustworthy and internal trustful mail server. If now an e-mail is sent to: "user1@company.com; europe@company.com" and user1 is also a member of alias group "Europe" this e-mail is once received at the gateway mail server and, after resolving of the alias "Europe", multiple copies of this e-mail are received by the journal server. All these copies contain in the "Received:" information identical receiving time information at the internal trustful mail gateway server which thus can be used as trustful technical attribute information.

According to an embodiment, in the record 421 of an already journaled e-mail the verification value is stored as hash code of message content 425 which has been calculated as a hash value of the content information ("subject", "body", and "attachments") and further appropriate technical attribute information of the e-mail as explained above. If the comparison in operation 640 results in that the compared verification values are not identical although the message-ID were identical, the method branches to operation 650 reporting to the system, an administration service (not shown in FIG. 4) or the administrator directly that a potentially falsified e-mail has been detected. The method is then continued by operation 660 so as there is no duplicate e-mail already recorded by the system (no-branch after operation 630).

In operation 660, a new record 421 is generated for the e-mail to be journaled by relocation service program 250. The new record 421 comprises the calculated hash code of message-ID 430 and hash code of message content 425 as a message identification table. The e-mail (its content including, e.g., body and attachments) is stored in a memory structure 455 with a new archive server ID "docID" which is then also added to the record 421 as archive server ID 440 (operation 670). The metadata of the e-mail are stored by attribute service 460 with a new attribute service ID which is then also added to the new record 421 as attribute service ID 435 (operation 680).

Figure 5A:
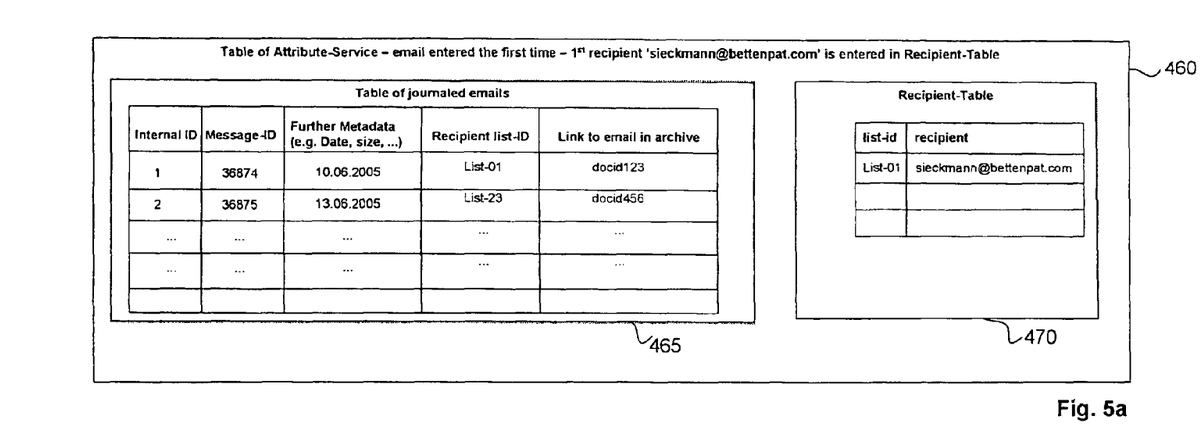
FIGS. 5a and 5b show, exemplary, tables in an attribute service according to embodiments of the present invention.
Figure 5B:
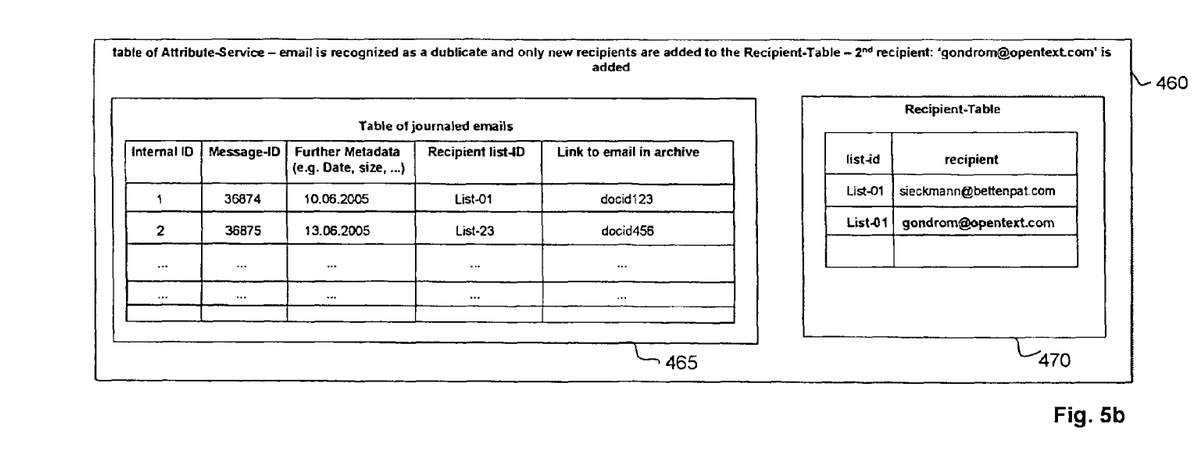

FIG. 5a illustrates tables in attribute service 460 to store the metadata according to an embodiment of the present invention. Table of jounaled e-mails 465 contain a column for each of the following information: internal ID (optional) containing an internal identification given by the system, message ID containing the message ID information, further metadata containing further technical attribute information depending on the implementation and the mail server program/e-mail communications system used, e.g. sending time information, receiving time information at trusted internal gateway mail server, size information, etc., a recipient list-ID containing a list identification ("list-ID") referring to a recipient table 470 also contained in attribute service 460 listing all recipients of the e-mail, and a link to the e-mail stored by archive service 450 containing the archive service ID. In FIG. 5a, e.g., the first entry in table 465 (internal ID "1") lists an e-mail with message ID 36874, sent on Jun. 10, 2005 having recipients as listed in recipient table 470 under recipient list ID "list-1", and which is stored by the archive service under archive service ID "docID 123". Recipient table 470 lists under list-ID "list-01" only one recipient "d.sieckmann@bettenpat.com". in archive service 450, the e-mail "e-mail1" with attachment "abc.doc" is stored under its archive service ID (docID) "docID 123". Thus, the e-mail processed by relocation service program 250 has been successfully recorded according to an embodiment of the present invention and the tables 465 and 470 serve as journal or journal report.

Returning back to the verification in operation 640, the method branches to operation 690 if also the determination of the verification value proofs that all relevant attributes taken into account when calculating the verification value depending on the particular embodiment are identical so that the relocation service considers the e-mail to be journaled being a duplicate of an already recorded e-mail. In that case in operation 690 the metadata in the entry of the already recorded e-mail are updated. This means that relocation service program 250 extracts the recipient information out of the e-mail to be journaled and modifies the existing entry of the already recorded e-mail in the respective tables 465 and 470 in attribute service 460 by adding the extracted additional recipient information. The modification or update of the entry will now be described in detail with reference to FIG. 5b. For example, a duplicate of the e-mail with internal ID "1" has been identified by the system and is now recorded by attribute service 460. The entry of the metadata in the table of journaled e-mails 465 is not modified since all the information given in that table are identical. The recipient table 470 has however been updated and now lists under list ID "list-01" a further recipient "gondrom@opentext.com". This further recipient information has been extracted from the new e-mail to be journaled and has now been added to the entry of this e-mail comprising the information from tables 465 and 470. According to an embodiment, the relocation service program 250 will also detect if the recipient information extracted from the e-mail to be journaled has already been recorded in recipient table because, e.g., the same e-mail has been sent twice to the same recipient. This could e.g. be the case if an e-mail is sent to recipient "user1" and recipient group with alias "Europe" of which is user1 also a member (see above). The database record 421 according to the embodiment as shown in FIG. 4 comprising attribute service ID 435 and archive service ID 440 linking the e-mail as stored by archive service 450 and its metadata stored by attribute service 460 together. According to the embodiment as illustrated with reference to FIG. 5a and 5b, the entry in table 465 also contains a link to the e-mail recorded by the archive service. It is clear for the person skilled in the art that it would also be possible to implement a respective link to the metadata in the attribute service (attribute service ID) for each e-mail in memory 455 of archive service 450 or even only providing links between the respective data entries in archive and attribute service without the need to store this IDs in the database record (but which then records the internal ID or the message ID) or by providing only links from the database record 421 to the respective entries in the archive service and attribute service without having direct links between them as long as the recorded information can uniquely be identified, retrieved and reconstructed.

U.S. patent application Ser. No. 11/145,496, which is incorporated herein by reference in its entirety, relates to the storage-efficient archiving of electronic messages which contain attachments and the systems and methods described therein are suitable to be implemented for a storage efficient archiving of e-mails containing attachments in the archive server 450. Said application further describes in detail how e-mails can be archived in an archive server architecture.

After the modification or update of the existing entry in attribute service 460 has been completed, the method, according to an embodiment, is continued in operation 695 according to which the relocation service program 250 removes the e-mail 41 from journal server 60 since it has successfully been recorded by system 400 according to the present invention.

Figure 7:
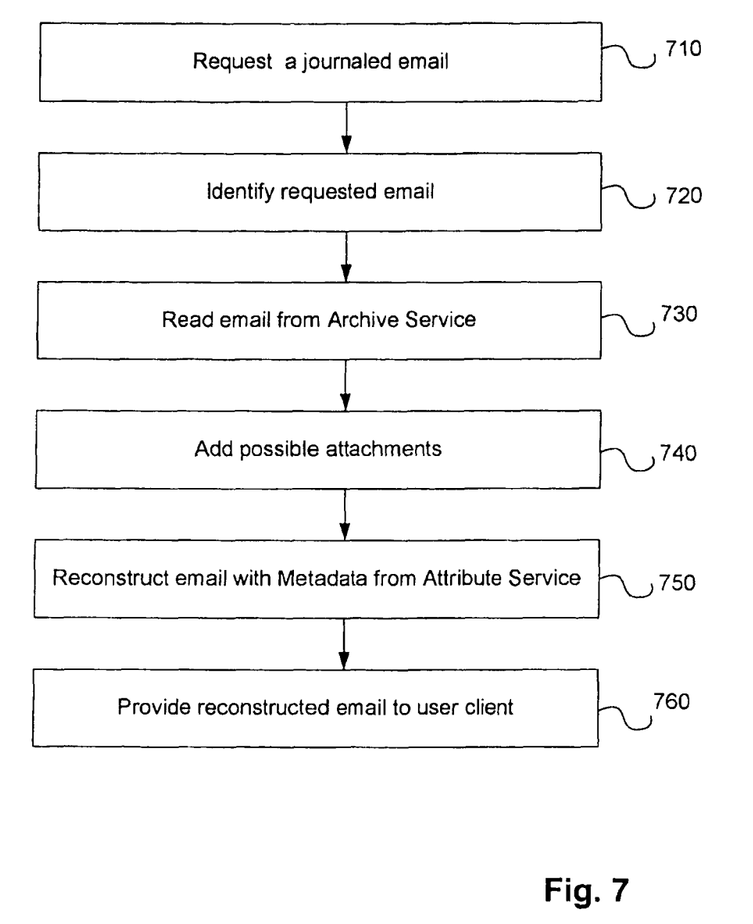
FIG. 7 is a flow chart of a method according to an embodiment of the present invention.

With reference to FIG. 7, a method and system according to an embodiment of the present invention for reconstructing and retrieving of e-mails from server 200 or system 400 will now be described. A user client (e.g. a web-based client) of the attribute service 460 is provided to a user for a search of journaled e-mails in the journal. If the user finds a journaled e-mail by the entered metadata, e.g. recipient, data or subject information, according to his search, the user requests the found e-mail by selecting and requesting this e-mail and a request for this journaled e-mail is sent to the relocation service program of server 200, archive server 480 or directly to attribute service 460 (operation 710). According to the metadata contained in the request the attribute service identifies the entry of the requested e-mail in its table 465 (operation 720) and the respective e-mail according to the link in "e-mail in archive" ("docID") the corresponding e-mail is read from archive service in operation 730. If the e-mail contains attachments, this attachments are added in operation 740 according to e.g. incorporated U.S. patent application Ser. No. 11/145,496. The e-mail is then reconstructed with the relevant metadata read from the entries in tables 465 and 470 and the e-mail content containing the e-mail itself and its attachments as read from the archive service by relocation service program 250 or directly by the attribute service in operation 750. The reconstructed e-mail is then provided from the attribute service or relocation service to the user client in operation 760 and, thus, the user is able to display or further process the reconstructed e-mail.

According to preferred embodiments of the present invention, the methods and systems described herein are implemented on data processing equipment suitable for same, such as, e.g., computers organized, e.g., in a client server environment.

All appropriate combinations of features described above are to be considered as belonging to the invention, even if they have not been explicitly described in their combination.

Having described and illustrated their principles of the present invention in embodiments thereof, it should be apparent to those skilled in the art that the present invention may be modified in arrangement and detail without departing from such principles. Changes and modifications within the spirit and scope of the present invention may be made without departing from the spirit thereof, and the present invention includes all such changes and modifications.

What is claimed is:

1. A method for journaling of e-mail messages, comprising:
   receiving a copy of a first e-mail message sent from or received on a mail server, wherein the first e-mail message contains metadata and content data and wherein the metadata of the first e-mail message contains a message-ID stored as an independent field in the metadata of the first e-mail message distinct from a subject of the first e-mail message and e-mail addresses for the first e-mail message that specify senders and recipients of the first e-mail message, wherein the message-ID identifies the first e-mail message as a particular e-mail message;
   recording the copy of the first e-mail message by a relocation service running on a journal server remote from the mail server, wherein the relocation service performs a method of recording comprising:
   determining whether a second e-mail message having said message-ID in the metadata of said second e-mail message has already been recorded;
   if the second e-mail message having said message-ID has already been recorded in a database of e-mail messages, adding the metadata for the first e-mail message to a set of metadata linked to content data of the second e-mail message in the database but not recording any of the content data of the first e-mail message;
   if no second e-mail having said message-ID has been recorded:
   generating a first entry for the first e-mail message in the database;
   determining a first e-mail message verification value based on the content data of the first e-mail message;
   storing said first e-mail message verification value and the metadata of the first e-mail message in said first entry; and
   recording the entire content data of the first e-mail message in the database separate from content data of other e-mail messages and linking the content data of the first e-mail message to the first entry.

2. The method according to claim 1, wherein the relocation service further performs the steps of:
   determining the first e-mail message verification value based on attributes of the first e-mail message when for the message-ID second e-mail message has already been recorded;
   determining whether the first e-mail message verification value is identical with a second e-mail message verification value of the already recorded second e-mail message having the same message-ID;
   performing the step of adding the metadata for the first e-mail message to a set of metadata linked to content data of the second e-mail message but not recording the content data of the first e-mail message when the first and second e-mail message verification values are identical by updating a second entry of the second e-mail message with the metadata of the first e-mail message; and
   storing said first e-mail message verification value and the metadata of the first e-mail message in said first entry and recording the content data of the first e-mail message with a link to the first entry when the first and second e-mail message verification values are not identical.

3. The method according to claim 2, further comprising:
   identifying the first e-mail message as an e-mail message with a falsified message-ID when the message-ID of the first and second e-mail messages are identical but the first and second e-mail message verification values are not identical; and
   sending a warning to the relocation service.

4. The method according to claim 1, wherein the e-mail message verification value contains at least one checksum of content data of the e-mail message.

5. The method according to claim 4, wherein the checksum is calculated from the contents of subject, body and possible attachments of the e-mail message.

6. The method according to claim 4, wherein the checksum is calculated from at least one technical attribute of the e-mail message which is unambiguous for the e-mail message.

7. The method according to claim 6, wherein one of the technical attributes is the sending time of the e-mail message.

8. The method according to claim 4, wherein the checksum is a unique hash value of the subject, body, attachment and/or technical attribute of the e-mail message.

9. The method according to claim 1, wherein the metadata comprises recipient information and/or technical attributes of the e-mail message.

10. The method according to claim 1, further comprising:
    providing an e-mail message identification table containing the message-ID for each recorded e-mail message.

11. The method according to claim 10, wherein in the e-mail message identification stable further contains the e-mail message verification value and a reference to the entry for each recorded e-mail message.

12. The method according to claim 11, further comprising:
    storing said e-mail message identification table on the database;
    storing said entry by an attribute service and/or the database;

storing said e-mail message by an archive service; and
wherein in the e-mail message identification table for each recorded e-mail message a data record containing the message-ID, e-mail message verification value, reference to the entry on the attribute service and reference to the e-mail message on the archive service is stored.

13. The method of claim 10, further comprising:
requesting a journaled e-mail message from a user client;
identifying a recorded e-mail message as the requested e-mail message by comparing metadata of the requested e-mail message with metadata recorded by the relocation service;
retrieving the identified e-mail message;
reconstructing the retrieved e-mail message with its metadata and possible attachments; and
providing the reconstructed e-mail message to the user client.

14. The method according to claim 1, further comprising:
providing a journal of recorded e-mail messages containing a list of entries generated by the relocation service.

15. The method of claim 1, further comprising storing entries for recorded e-mails in a relational database indexed by e-mail message-ID numbers.

16. A computer program product comprising a physical computer readable storage medium containing computer executable program code for journaling of e-mail messages containing metadata and content data, and wherein the computer program is executable by a processor, the computer executable code comprising code executable to:
determine a message-ID for a first e-mail message from an independent field in the metadata of the first e-mail message distinct from a subject of the first e-mail message and e-mail addresses for the first e-mail message that specify senders and recipients of the first e-mail, wherein the message-ID identifies the first e-mail message as a particular e-mail message;
determine whether a second e-mail message having said message-ID in the metadata of said second e-mail message has already been recorded in a database;
add only metadata of the first e-mail message to the metadata of the second e-mail message such that the metadata of the first e-mail message is linked to content data of the second e-mail message if the second e-mail message has already been recorded in the database;
generate a first entry for the first e-mail message when no second e-mail message having said message-ID has been recorded;
determine a first e-mail message verification value based on the content data first e-mail message;
store said first e-mail message verification value and the metadata of the first e-mail message in said first entry; and
record the content data of the first e-mail message in the database separate from content data of other e-mail messages and link the content data of the first e-mail message to the first entry.

17. A system for journaling of e-mail messages, comprising:
a journaling system comprising one or more physical servers, the one or more physical servers coupled to one or more mail servers by a network, the journaling system providing a relocation service and configured to;
receive a copy of a first e-mail message over the network containing metadata and content data sent from or received on an e-mail server, wherein the metadata of the first e-mail message contains a message-ID stored as an independent field in the metadata of the first e-mail message distinct from a subject of the first e-mail message and e-mail addresses for the first e-mail message that specify senders and recipients of the first e-mail message, wherein the message-ID identifies the first e-mail message as a particular e-mail message;
determine whether a second e-mail message having said message-ID in the metadata of the second e-mail message has already been recorded in a database;
if the second e-mail message having said message-ID has already been recorded, add only metadata of the first e-mail message to the metadata of the second e-mail message in an entry for the second e-mail message in the database;
if no second e-mail message having said message-ID has been recorded:
generate a first entry for the first e-mail message,
determine a first e-mail message verification value based on the content data of the first e-mail message, and
store said first e-mail message verification value and the metadata of the first e-mail message in said first entry, and record the content data of the first e-mail message in the database separate from the content data of other e-mail messages with a link to the first entry.

18. The system according to claim 17, wherein said relocation service is further configured to:
determine the first e-mail message verification value based on attributes of the first e-mail message when for the message-ID the second e-mail message has already been recorded;
determine whether the first e-mail message verification value is identical with a second e-mail message verification value of the already recorded second e-mail message having the same message-ID;
perform the step of adding only metadata of the first e-mail message to the metadata of the second e-mail message in the entry for the second e-mail message when the first and second e-mail verification values are identical by updating the entry of the second e-mail message with the metadata of the first e-mail message, and
to store said first e-mail message verification value and the metadata of the first e-mail message in said first entry, and to record the first e-mail message with a link to the first entry when the first and second e-mail message verification values are not identical.

19. The system according to claim 18, wherein the system further comprises an administration service and the relocation service is further configured to identify the first e-mail message as an e-mail message with a falsified identification when the message-ID of the first and second e-mail messages are identical but the first and second e-mail message verification values are not identical, and to send a warning to the administration service.

20. The system according to claim 18, wherein, the first e-mail message verification value contains at least one checksum of the content of the first e-mail message, and the relocation service is configured to calculate the checksum from the contents of subject, body and possible attachments of the first e-mail message.

21. The system according to claim 20, wherein the relocation service is further adapted to calculate the checksum from at least one technical attribute of the first e-mail message uniquely defining the first e-mail message.

22. The system according to claim 20, wherein the relocation service is further configured to calculate the checksum as a unique hash value of the subject, body, attachment and/or technical attribute of the first e-mail message.

23. The system according to claim 17, further comprising:
an e-mail message identification table configured to contain the message-ID for each recorded e-mail message.

24. The system according to claim 23, wherein the e-mail message identification table is further configured to contain the e-mail message verification value and a reference to the entry for each recorded e-mail message.

25. The system according to claim 23, wherein the journaling system further comprises an archive server further comprising:
an attribute service running on the one or more servers which is configured to store said entry containing the metadata, wherein the metadata comprises recipient information of the first e-mail message;
an archive service running on the one or more servers which is configured to store e-mail messages in the database; and
wherein the e-mail message identification table is configured to store for each recorded e-mail message a data record containing identification, e-mail message verification value, reference to the entry on the attribute service and reference to the e-mail message on the archive service.

26. The system according to claim 25, wherein the relocation service or the attribute service is further configured to provide on request a journal of recorded e-mail messages containing a list of entries generated be the relocation service.

27. The system according to claim 25, further comprising a journal server configured to receive the copy of the first e-mail message sent from the mail server, and wherein the relocation service is configured to receive the copy of the first e-mail message sent from or received on the journal server; and the relocation service is further configured to remove the first e-mail message from the journal server after the first e-mail message or only metadata of the first e-mail message is recorded in the database.

28. The system according to claim 17, wherein the relocation service is further configured to reconstruct a journaled e-mail message requested from a user client, in which the relocation service is configured to identify a recorded e-mail message as the requested e-mail message by comparing metadata of the requested e-mail message with metadata recorded by the relocation service, to retrieve the identified e-mail message, to reconstruct the retrieved e-mail message with its metadata and possible attachments, and to provide the reconstructed e-mail message to the user client.

29. A system for journaling of e-mail messages, comprising:
a mail server;
a journaling system coupled to the mail server, the journaling system comprising a processor, a network interface, a non-transitory memory and a database, the memory storing computer code executable by the processor, the journaling system configured to:
receive a copy of a first e-mail message over a network from the mail server, the first e-mail containing metadata and content data, wherein the metadata of the first e-mail message contains a message-ID stored as an independent field in the metadata of the first e-mail message distinct from a subject of the first e-mail message and e-mail addresses for the first e-mail message that specify senders and recipients of the first e-mail message, wherein the message-ID identifies the first e-mail message as a particular e-mail message;
determine at the journaling system whether a second e-mail message having said message-ID in the metadata of the second e-mail message has already been recorded in the database;
if the second e-mail message having said message-ID has already been recorded, add at the journaling system only metadata of the first e-mail message to the metadata of the second e-mail message in an entry for the second e-mail message;
if no second e-mail message having said message-ID has been recorded:
generate at the journaling system a first entry for the first e-mail message,
determine at the journaling system a first e-mail message verification value based on the content data of the first e-mail message, and
store at the journaling system said first e-mail message verification value and the metadata of the first e-mail message in said first entry, and record the content data of the first e-mail message in the database separate from the content data of other e-mail messages with a link to the first entry.

30. The system according to claim 29, wherein the mail server is configured to send copies of e-mail messages sent to or received at the mail server to the journaling system.

31. The system according to claim 30, wherein the journaling system comprises a plurality of servers coupled to the mail server via the network.

32. The system of claim 31, wherein the journaling system comprises:
a journal server configured to receive emails from the mail server;
an archive server coupled to the journal server configured to determine that the journal has a new e-mail message to journal and to process the new e-mail message as the first e-mail message.

33. The system according to claim 29, wherein the journaling system is further configured to:
determine the first e-mail message verification value based on attributes of the first e-mail message when for the message-ID of first e-mail message has already been recorded;
determine whether the first e-mail message verification value is identical with a second e-mail message verification value of the already recorded second e-mail message having the same message-ID;
perform the step of adding only metadata of the first e-mail message to the metadata of the second e-mail message in the entry for the second e-mail message when the first and second e-mail verification values are identical by updating the entry of the second e-mail message with the metadata of the first e-mail message, and
store said first e-mail message verification value and the metadata of the first e-mail message in said first entry, and to record the first e-mail message with a link to the first entry when the first and second e-mail message verification values are not identical.

34. The system according to claim 33, wherein the journaling system is further configured to provide an administration service and a relocation service, wherein the relocation service is further configured to identify the first e-mail message as e-mail message with a falsified identification when the message-ID of the first and second e-mail messages are identical but the first and second e-mail message verification values are not identical, and to send a warning to the administration service.

35. The system according to claim 34, wherein, the first e-mail message verification value contains at least one checksum of the content of the first e-mail message, and the relocation service is configured to calculate the checksum from the contents of subject, body and possible attachments of the e-mail message.

36. The system according to claim 35, wherein the relocation service is further adapted to calculate the checksum from at least one technical attribute of the e-mail message uniquely defining the e-mail message.

37. The system according to claim 35, wherein the relocation service is further configured to calculate the checksum as a unique hash value of the subject, body, attachment and/or technical attribute of the e-mail message.

38. The system according to claim 29, wherein the journaling system is further configured to reconstruct a journaled e-mail message requested from a user client, in which the journaling system is configured to identify a recorded e-mail message as the requested e-mail message by comparing metadata of the requested e-mail message with metadata recorded by the journaling system, to retrieve the identified e-mail message, to reconstruct the retrieved e-mail message with its metadata and possible attachments, and to provide the reconstructed e-mail message to the user client.

* * * * *

UNITED STATES PATENT AND TRADEMARK OFFICE
CERTIFICATE OF CORRECTION

| | | |
|---|---|---|
| PATENT NO. | : 8,429,233 B2 | Page 1 of 1 |
| APPLICATION NO. | : 11/305543 | |
| DATED | : April 23, 2013 | |
| INVENTOR(S) | : Sell | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1384 days.

Signed and Sealed this
Second Day of December, 2014

Michelle K. Lee
*Deputy Director of the United States Patent and Trademark Office*